(12) United States Patent
Wright

(10) Patent No.: US 10,518,831 B2
(45) Date of Patent: Dec. 31, 2019

(54) SELF-POWERED ACTIVELY STEERABLE CONVERTER DOLLIES FOR LONG COMBINATION VEHICLES

(71) Applicant: Wrightspeed, Inc., Alameda, CA (US)

(72) Inventor: Ian Wright, Alameda, CA (US)

(73) Assignee: Wrightspeed, Inc., Alameda, CA (US)

( * ) Notice: Subject to any disclaimer, the term of this patent is extended or adjusted under 35 U.S.C. 154(b) by 101 days.

(21) Appl. No.: 15/959,777

(22) Filed: Apr. 23, 2018

(65) Prior Publication Data

US 2018/0304944 A1 Oct. 25, 2018

Related U.S. Application Data

(60) Provisional application No. 62/488,491, filed on Apr. 21, 2017.

(51) Int. Cl.
*B62D 59/04* (2006.01)
*B62D 15/02* (2006.01)
(Continued)

(52) U.S. Cl.
CPC .............. *B62D 59/04* (2013.01); *B60L 7/10* (2013.01); *B60W 10/08* (2013.01); *B60W 10/20* (2013.01);
(Continued)

(58) Field of Classification Search
CPC ........ B60L 2200/28; B60L 50/50; B60L 7/10; B60R 16/03; B60W 10/08; B60W 10/20; B60W 2300/145; B60W 2510/20; B60W 2520/10; B60W 2520/105; B60W 2520/22; B60W 2520/28; B60W 2540/10; B60W 2710/08; B60W 2710/207; B60W 30/182; B62D 13/00; B62D 13/005; B62D 13/04; B62D 15/021; B62D 53/06; B62D 53/08; B62D 53/0864; B62D 59/04; B62D 6/002
See application file for complete search history.

(56) References Cited

U.S. PATENT DOCUMENTS 8,004,242 B1 * 8/2011 Purkey ................. B60R 16/033
  320/130
8,365,674 B2 * 2/2013 Banwart ................. B61B 1/00
  105/159

(Continued)

*Primary Examiner* — Babar Sarwar
(74) *Attorney, Agent, or Firm* — Kwan & Olynick LLP

(57) ABSTRACT

Provided are self-powered actively steerable converter dollies (SPASCDs) for long combination vehicles (LCVs), LCVs utilizing SPASCDs, and methods of operating such LCVs. These SPASCDs could be used with conventional tractors and/or specifically configured tractors. A SPASCD may include an electrical drive, which can generate power (e.g., to charge SPASCD's battery) or generate torque using the electrical power stored in SPASCD's battery (e.g., to assist the tractor during acceleration or going uphill). The SPASCD also comprises steerable wheels and a steering component, configured to change the steering angle of the steerable wheels. The steering angle may be changed in response to various inputs, such as the steering angle of the tractor's front steerable wheels, the steering angle of the steerable wheels of another trailer in the same LCV, sensor inputs, and the like. This steering feature allows change the track of the SPASCD, e.g., to follow the tractor's track.

20 Claims, 9 Drawing Sheets

(51) Int. Cl.
  *B62D 6/00* (2006.01)
  *B62D 53/08* (2006.01)
  *B60W 10/08* (2006.01)
  *B60W 10/20* (2006.01)
  *B60W 30/182* (2012.01)
  *B60L 7/10* (2006.01)
  *B62D 53/06* (2006.01)
  *B60R 16/03* (2006.01)

(52) U.S. Cl.
  CPC .......... *B60W 30/182* (2013.01); *B62D 6/002* (2013.01); *B62D 15/021* (2013.01); *B62D 53/08* (2013.01); *B60L 2200/28* (2013.01); *B60R 16/03* (2013.01); *B60W 2300/145* (2013.01); *B60W 2510/20* (2013.01); *B60W 2520/10* (2013.01); *B60W 2520/105* (2013.01); *B60W 2520/22* (2013.01); *B60W 2520/28* (2013.01); *B60W 2540/10* (2013.01); *B60W 2710/08* (2013.01); *B60W 2710/207* (2013.01); *B62D 53/06* (2013.01)

(56) References Cited

U.S. PATENT DOCUMENTS

| | | | | |
|---|---|---|---|---|
| 9,738,125 | B1* | 8/2017 | Brickley | H04W 4/70 |
| 10,384,560 | B2* | 8/2019 | Healy | B60L 8/003 |
| 2001/0027892 | A1* | 10/2001 | Masters | B62D 13/04 |
| | | | | 180/403 |
| 2009/0139789 | A1* | 6/2009 | Yang | B60W 20/00 |
| | | | | 180/243 |
| 2010/0141201 | A1* | 6/2010 | Littrell | H02J 7/35 |
| | | | | 320/101 |
| 2011/0072999 | A1* | 3/2011 | Banwart | B61B 1/00 |
| | | | | 104/26.1 |
| 2012/0152634 | A1* | 6/2012 | Skis | B60K 25/08 |
| | | | | 180/165 |
| 2014/0247005 | A1* | 9/2014 | Graham | B60R 16/03 |
| | | | | 320/107 |
| 2016/0318406 | A1* | 11/2016 | Healy | B60L 8/003 |
| 2016/0372957 | A1* | 12/2016 | Blakely | H02J 50/80 |
| 2018/0093655 | A1* | 4/2018 | Healy | B60L 1/003 |
| 2018/0236994 | A1* | 8/2018 | Healy | B60W 20/14 |
| 2018/0297615 | A1* | 10/2018 | Banwart | B61D 47/005 |

* cited by examiner

SELF-POWERED ACTIVELY STEERABLE CONVERTER DOLLIES FOR LONG COMBINATION VEHICLES

CROSS-REFERENCE TO RELATED APPLICATIONS

This application claims the benefit under 35 U.S.C. § 119(e) of U.S. Provisional Patent Application 62/488,491, entitled: "SELF-POWERED ACTIVELY STEERABLE CONVERTER DOLLIES FOR LONG COMBINATION VEHICLES" filed on 21 Apr. 2017, which is incorporated herein by reference in its entirety for all purposes.

BACKGROUND

Significant fuel and labor savings can be realized in long-haul trucking by towing more than one trailer behind a tractor, which may be referred to as long combination vehicles (LCVs). For example, road trains having many trailers behind a single tractor have been used in Australia (e.g., mining operations). Turnpike doubles and triples (tractors with two or three trailers) have been used in the US and Canada. However, these examples of conventional LCVs have various problems. For example, the rearmost axle of the rear trailer will follow a sharper radius or, more generally different path, than the tractor will, cutting the corner. This path difference makes maneuvering of LCVs difficult and not possible in some areas, such as on narrow streets. Furthermore, this path difference can cause damage to road edges and also to LCVs. Another problem with conventional LCVs is their stability. At high speeds, an LCV may experience rearward amplification such that trailers, positioned further from the tractor, tend to move from side to side more than trailers positioned closer. These causes wagging of the entire LCV. Yet another problem is associated with a tractor being the only power source for propelling the entire LCV. With only one tractor engine for gross vehicles weights equal to two or more regular (single-trailer) rigs, the performance of large LCVs on hills is substantially degraded, which may cause traffic flow problems. For these reasons operation of large LCVs is restricted in various ways in different countries and states.

SUMMARY

Provided are self-powered actively steerable converter dollies (SPASCDs) for long combination vehicles (LCVs), LCVs utilizing SPASCDs, and methods of operating such LCVs. These SPASCDs could be used with conventional tractors and/or specifically configured tractors. A SPASCD may include an electrical drive, which can generate power (e.g., to charge SPASCD's battery) or generate torque using the electrical power stored in SPASCD's battery (e.g., to assist the tractor during acceleration or going uphill). The SPASCD also comprises steerable wheels and a steering component, configured to change the steering angle of the steerable wheels. The steering angle may be changed in response to various inputs, such as the steering angle of the tractor's front steerable wheels, the steering angle of the steerable wheels of another trailer in the same LCV, sensor inputs, and the like. This steering feature allows change the track of the SPASCD, e.g., to follow the tractor's track.

A SPASCD may be used on a trailer of a LCV. In some embodiments, the SPASCD comprises steerable wheels, a battery, an electrical drive, a steering component, and a system controller. The electrical drive is mechanically coupled to the steerable wheels, directly or indirectly, e.g., using a gearbox. Furthermore, the electrical drive is electrically coupled to the battery. The electrical drive is configured to operate in one of operating modes selected from the group consisting of a power-generating mode, a torque-generating mode, and a passive mode. Specifically, in the power-generating mode, the electrical drive is configured to convert mechanical power received from the steerable wheels into electrical power transmitted to the battery. In the torque-generating mode, the electrical drive is configured to convert electrical power received from the battery to mechanical power transmitted to the steerable wheels. Finally, in the passive mode, the electrical drive is configured to neither generate nor convert electrical power or mechanical power. The steering component is mechanically coupled to the steerable wheels and electrically coupled to the battery. The steering component is configured to change the steering angle of the steerable wheels. The system controller is communicatively coupled to the electrical drive and to the steering component and configured to select one of the operating mode of the electrical drive and to determine the steering angle of the steerable wheels. A dolly coupler, if one of a part of the SPASCD, is configured to couple to a tractor or an additional trailer to form the long combination vehicle.

In some embodiments, the SPASCD further comprises one or more sensors selected from the group consisting of a velocity sensor, a wheel speed sensor, an accelerometer, and a coupler angle sensor. The system controller is communicatively coupled to the one or more sensors and configured to receive input from the one or more sensors. The system controller may be configured to select one of the operating modes of the electrical drive and to determine the steering angle of the steerable wheels based on the input received from the one or more sensors. In some embodiments, the system controller is configured to communicatively couple to the tractor and to select one of the operating modes of the electrical drive and to determine the steering angle of the steerable wheels based on input received from the tractor. The input from the tractor is selected from the group consisting of a position of an accelerator pedal of the tractor, a steering angle of steerable wheels of the tractor, a route map, and a current location. In some embodiments, the system controller is configured to communicatively couple to the additional trailer and to select one of the operating modes of the electrical drive and to determine the steering angle of the steerable wheels based on input received from the additional trailer.

In some embodiments, the SPASCD further comprises a drive inverter, electrically coupled to the battery and to the electrical drive and communicatively coupled to the system controller. The drive inverter is configured to change one or more characteristics of the electrical current transmitted between the battery and to the electrical drive. For example, the electrical drive may utilize alternating current, while the battery may utilize direct current.

In some embodiments, the SPASCD of claim 1, further comprising a gearbox, coupling the steerable wheels to the electrical drive. The gearbox may be communicatively coupled to the system controller and configured to switch gears based on the input from the system controller. The gear change may be used to change output of the electrical drive in the power-generating mode and/or the torque-generating mode.

In some embodiments, the SPASCD is configured to rotatably and detachably couple to a rear portion the trailer. For example, the SPASCD may comprise a rotatable coupling mechanism shaped as a slot and configured to receive a kingpin of the rear portion of the trailer such that the rear portion of the trailer is able to rotate relative to the SPASCD.

Also provided is an LCV, comprising a tractor and a trailer, detachably coupled to the tractor. The trailer comprises a rear portion and a SPASCD, coupled to the rear portion. The SPASCD comprises steerable wheels, a battery, electrical drive, a steering component, and a system controller. The electrical drive is mechanically coupled to the steerable wheels, directly or indirectly, e.g., using a gearbox. Furthermore, the electrical drive is electrically coupled to the battery. The electrical drive is configured to operate in one of operating modes selected from the group consisting of a power-generating mode, a torque-generating mode, and a passive mode. Specifically, in the power-generating mode, the electrical drive is configured to convert mechanical power received from the steerable wheels into electrical power transmitted to the battery. In the torque-generating mode, the electrical drive is configured to convert electrical power received from the battery to mechanical power transmitted to the steerable wheels. Finally, in the passive mode, the electrical drive is configured to neither generate nor convert electrical power or mechanical power. The steering component is mechanically coupled to the steerable wheels and electrically coupled to the battery. The steering component is configured to change the steering angle of the steerable wheels. The system controller is communicatively coupled to the electrical drive and to the steering component and configured to select one of the operating mode of the electrical drive and to determine the steering angle of the steerable wheels. In some embodiments, the system controller is communicatively coupled to the tractor and is configured to select one of the operating modes of the electrical drive and to determine the steering angle of the steerable wheels based on input received from the tractor. The input from the tractor is selected from the group consisting of a position of an accelerator pedal of the tractor, a steering angle of steerable wheels of the tractor, a route map, and a current location.

In some embodiments, the SPASCD is configured to rotatably and detachably couple to a rear portion a trailer. For example, the SPASCD may comprise a rotatable coupling mechanism shaped as a lot and configured to receive a kingpin of the rear portion of the trailer such that the rear portion of the trailer is able to rotate relative to the SPASCD.

Also provided is a method of operating a LCV, comprising a tractor a trailer, detachably coupled to the tractor. The trailer comprises a SPASCD, comprising steerable wheels, a battery, an electrical drive, and a steering component, and a system controller. The method comprises determining an operating mode of the electrical drive. The operating mode is determined using the system controller. The operating mode is selected from the group consisting of a power-generating mode, a torque-generating mode, and a passive mode. The method comprises operating the electrical drive in the operating mode determined by the system controller. In the power-generating mode, the electrical drive converts mechanical power received from the steerable wheels into electrical power transmitted to the battery. In the torque-generating mode, the electrical drive converts electrical power received from the battery to mechanical power transmitted to the steerable wheels. In the passive mode, the electrical drive neither generates nor converts electrical power or mechanical power. The method comprises determining the steering angle of the steerable wheels. The steering angle is determined using the system controller. The method comprises setting the steering angle of the steerable wheels using the steering component, mechanically coupled to the steerable wheels and electrically coupled to the battery.

In some embodiments, the method further comprises determining one or more dolly operating parameters of the SPASCD. The one or more dolly operating parameters are selected from the group consisting of (a) velocity of the SPASCD determined using a velocity sensor, (b) wheel speed of the steerable wheels determined using a wheel speed sensor, (c) acceleration of the self-powered actively steerable converter determined using an accelerometer, (d) an angle of the dolly coupler relative to the tractor determined using a coupler angle sensor; and (e) an angle of the SPASCD relative to the rest of the trailer. The method comprises transmitting the one or more dolly operating parameters to the system controller. The system controller determines the operating mode of the electrical drive and determines the steering angle of the steerable wheels based on the one or more dolly operating parameters.

In some embodiments, the method further comprises transmitting one or more tractor operating parameters to the system controller. The one or more tractor operating parameters comprise a position of an accelerator pedal of the tractor, a steering angle of steerable wheels of the tractor, a route map, and a current location. The system controller determines the operating mode of the electrical drive and determines the steering angle of the steerable wheels based on the one or more tractor operating parameters. For example, the power-generating mode may be selected by the system controller when the accelerator pedal of the tractor is in a released position, and the torque-generating mode is selected by the system controller when the accelerator pedal of the tractor is pressed beyond a threshold position.

In some embodiments, the steering angle of the steerable wheels of the SPASCD is set equal to the steering angle of the steerable wheels of the tractor with a set delay, the set delay is a ratio of a distance between the steerable wheels of the SPASCD and the steerable wheels of the tractor and a velocity of the LCV.

These and other embodiments are described further below with reference to the figures.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Figure 1A:
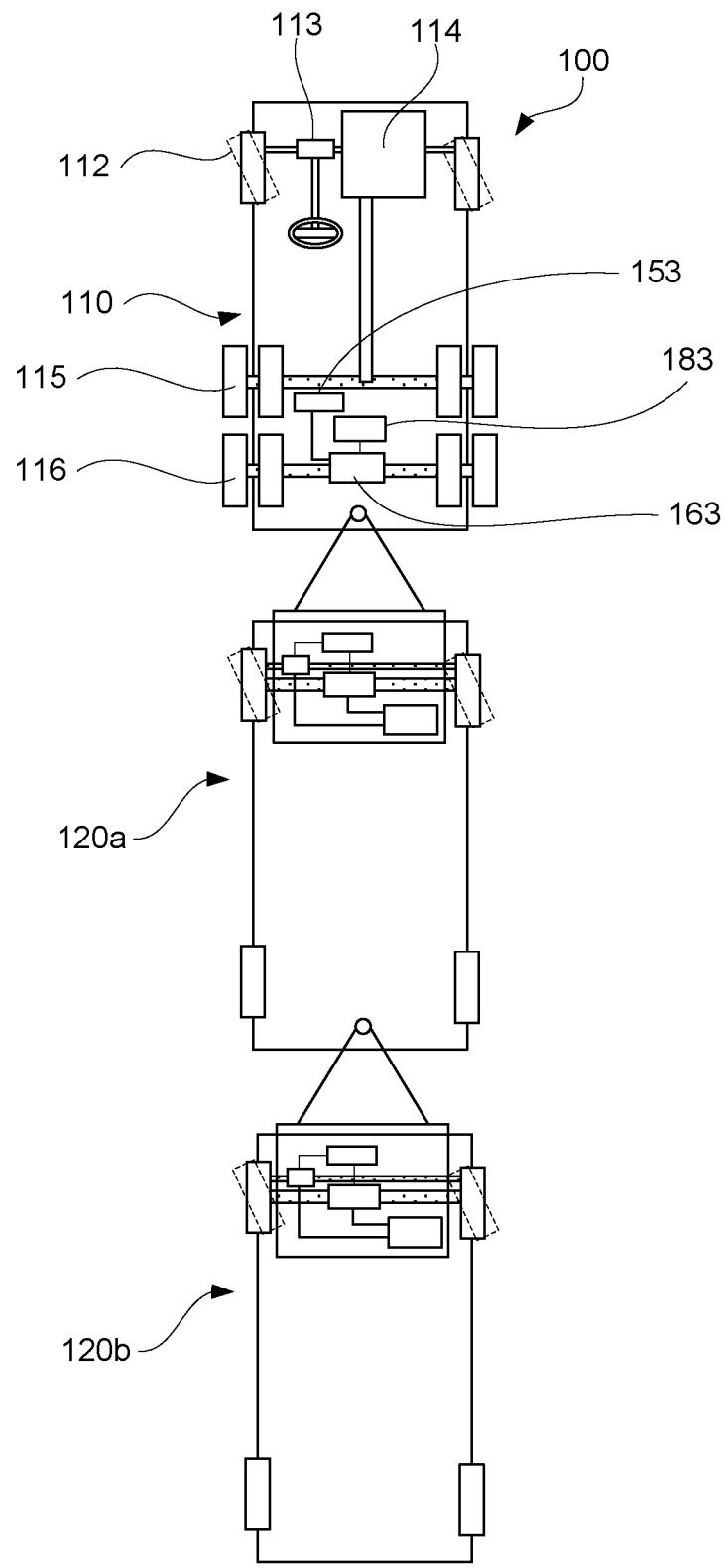
FIG. 1A is a schematic illustration of a LCV with a tractor and two trailers, each equipped with a SPASCD, in accordance with some embodiments.

FIG. 1A is a schematic illustration of LCV 100 comprising tractor 110 and two trailers 120a and 120b, in accordance with some embodiments. In this example, each one of two trailers 120a and 120b comprises a SPASCD as, further described below. Furthermore, some components of a SPASCD are shown connected to a rear axle of tractor 110.

Tractor 110 comprises front steerable wheels 112 controlled by a driver of LCV 100 using steering unit 113. Steerable wheels 112 control the tack of tractor 110 and to a certain extent of LCV 100. Additional factors determining the tack of LCV 100 include the length of LCV 100 (or, more specifically, the length of each one of tractor 110 and two trailers 120a and 120b), coupling between tractor 110 and first trailer 120a as well as between first trailer 120a and second trailer 120b, and steering angle of the wheels of two trailers 120a and 120b.

Tractor 110 comprises drive unit 114, providing mechanical power to drive wheels 115. Drive unit 114 may be an internal combustion engine (ICE), electrical motor, or various combinations of thereof. Some examples of ICEs include, but are not limited to, a diesel engine, a gasoline engine, a turbine engine. During some stages of operating LCV 100, drive unit 114 may be the only component of LCV 100 propelling LCV 100. Other components (further described below) may be used at various other stages in addition to or instead of drive unit 114 for propelling LCV 100. Furthermore, drive unit 114 may be used to receive mechanical power from drive wheels 115 9 (e.g., during engine braking).

Tractor 110 is coupled to first trailer 120a, which in also coupled to second trailer 120b. While FIG. 1A illustrates LCV 100 with two trailers 120a and 120b, one having ordinary skills in the art would understand that LCV 100 may have any number of trailers (e.g., zero, one, two, three, four, five, and so on). In general, the number is determined based on the current operating requirements and local regulations. For example, some countries or states may impose restrictions on this number. Second trailer 120b may have the same configuration as first trailer 120a (e.g., have the same components and same functionality). Furthermore, second trailer 120b may be interchangeable with first trailer 120a. In other words, second trailer 120b may be connected to tractor 110 and first trailer 120a may be connected to second trailer 120b, with second trailer 120b being positioned between tractor 110 and first trailer 120a.

Figure 1B:
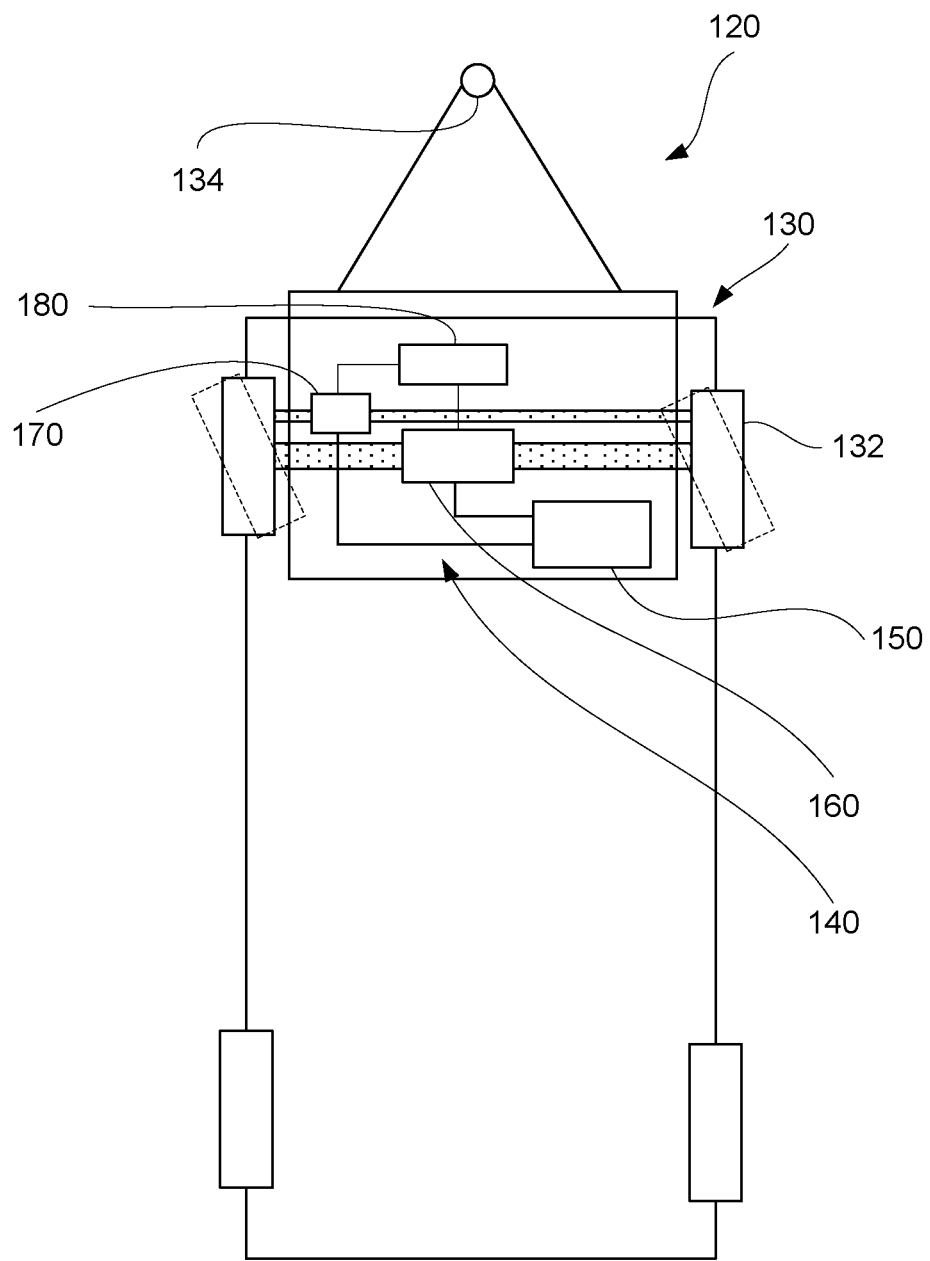
FIG. 1B is a schematic view of a trailer, comprising a SPASCD, in accordance with some embodiments.
Figure 1C:
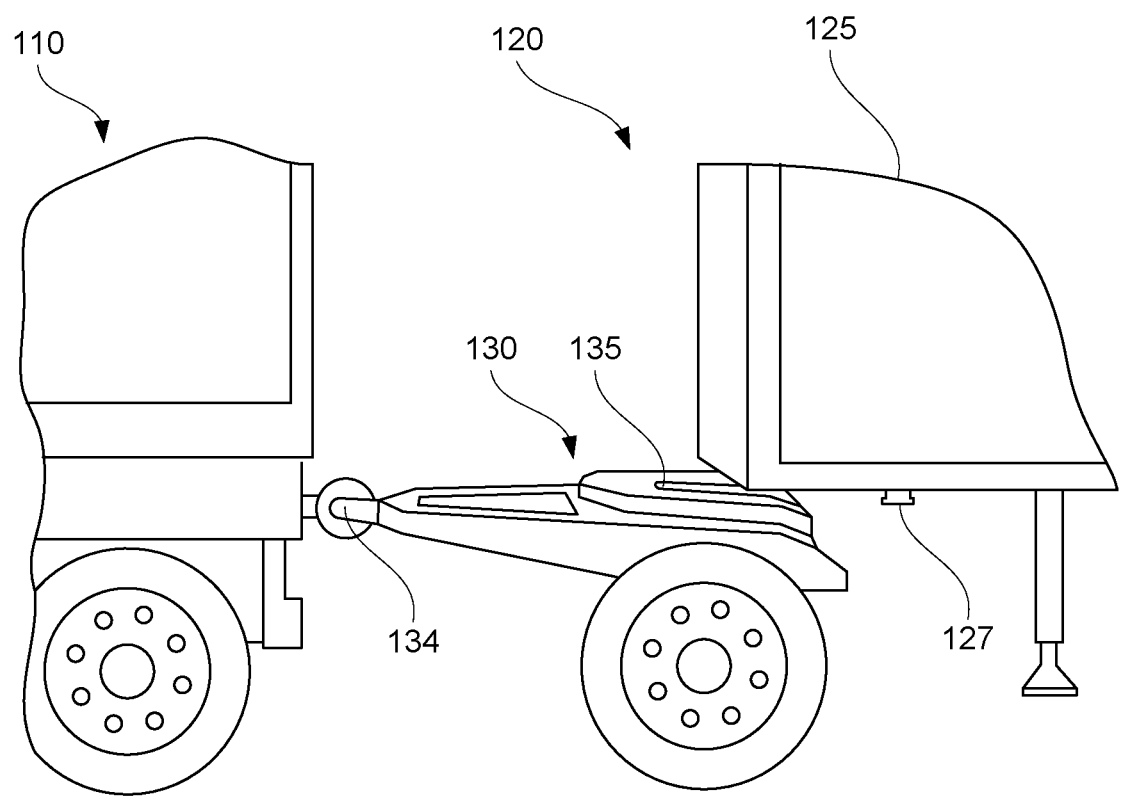
FIG. 1C is a schematic side view of a connection between a tractor and a trailer, comprising a SPASCD, in accordance with some embodiments.

In the following description, each one of first trailer 120a and second trailer 120b may be referred to as trailer 120. As schematically shown in FIGS. 1B and 1C, trailer 120 comprises SPASCD 130, which may be also referred to as a specially configured dolly, and rear portion 125. SPASCD 130 is used to couple tractor 110 or another trailer and may comprise dolly coupler 134 for this purpose. SPASCD 130 may be separable component of trailer 120 as, for example, schematically shown in FIG. 1C. For example, SPASCD 130 may comprise rotatable coupling mechanism 135 for receiving kingpin 127 of rear portion 125 of trailer 120. In some embodiments, rotatable coupling mechanism 135 is shaped as a slot as, for example, shown in FIG. 1C. Rotatable coupling mechanism 135 may be also referred to as a fifth wheel. In this example, SPASCD 130 is able to turn relative to rear portion 125 of trailer 120, in addition to being able to turn relative to tractor 110. However, other examples are within the scope.

Figure 1D:
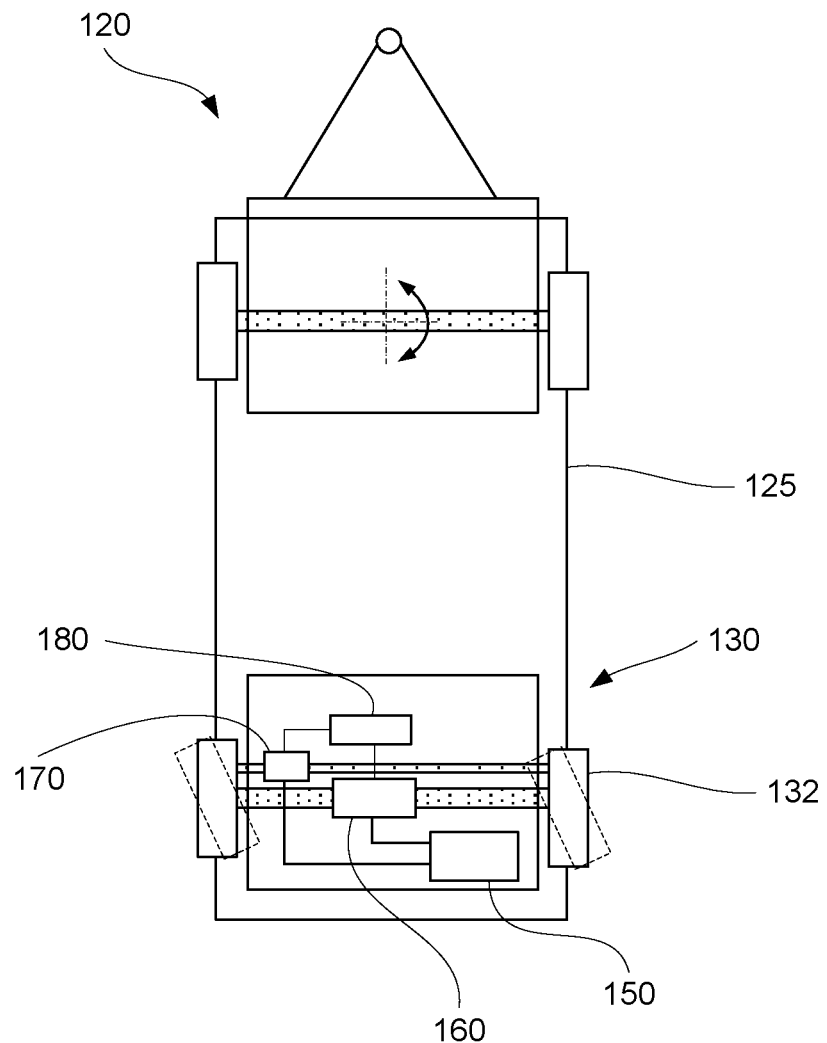
FIG. 1D is a schematic view of another example of a trailer, comprising a SPASCD.

FIG. 1D illustrates another example of trailer 120, which comprises SPASCD 130 and front portion 123. In this example, steerable wheels 132 of SPASCD 130 represent a rear axle of trailer 120. Unlike the example described above, SPASCD 130 may not turn relative to front portion 123. Furthermore, SPASCD 130 does not include a dolly coupler, which in this example is a part of front portion 123. Steering aspects of this example need to account to the wheel base of trailer 120, which is the distance between the front and rear axles. Otherwise, the operation of trailer 120 may be the same. In further examples (not shown), a trailer may include multiple SPASCDs, e.g., one positioned on each axle.

Referring to FIGS. 1B-1D, SPASCD 130 comprises steerable wheels 132, battery 150, battery 150, electrical drive 160, steering component 170, and system controller 180. An assembly of battery 150, electrical drive 160, steering component 170, and system controller 180 may be referred to as dolly operating mechanism 140. Dolly operating mechanism 140 be fabricated and sold as a standalone assembly and fitted onto conventional dollies to provide functionality of SPASCD 130, described herein. Specifically, dolly operating mechanism 140 may be configured to apply torque to steerable wheels 132, receive power from steerable wheels 132, and/or change the steering angle of steerable wheels 132.

Figure 2:
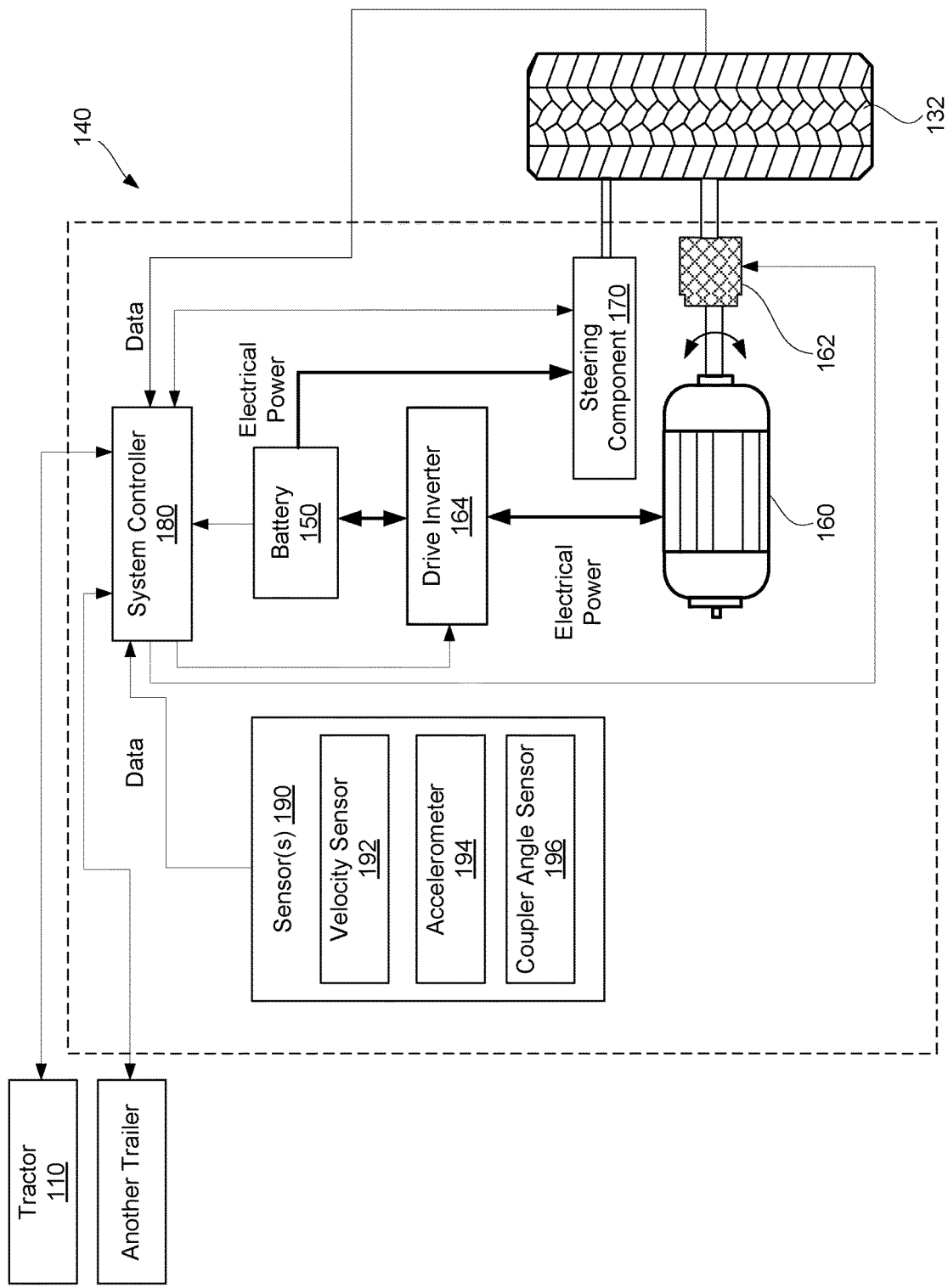
FIG. 2 is a schematic illustration of various components of a SPASCD, in accordance with some embodiments.

Referring to FIGS. 1B and 2, electrical drive 160 is mechanically coupled to steerable wheels 132, either directly or indirectly, e.g., using gearbox 162. Furthermore, steering component 170 may be mechanically coupled to steerable wheels 132 and configured to change the steering angle of steerable wheels 132. Steerable wheels 132 may be equipped with sensors, e.g., measuring rotation speeds of steerable wheels 132 (or, more specifically, e ach one of steerable wheels 132) and/or steering angles of steerable wheels 132.

Electrical drive 160 is electrically coupled to battery 150 to supply and receive electrical power from battery 150 at different operating regimes. Likewise, steering component 170 is coupled to battery 150 to receive electrical power when changing the steering angle of steerable wheels 132. Battery 150 may be charged from a power grid when LCV 100 or, more specifically, when SPASCD 130 is not in use. Furthermore, battery 150 may be charged using regenerative braking while operating SPASCD 130. Alternatively, battery 150 may be charged exclusively by regenerative braking while operating SPASCD 130. As further described below, battery 150 is used to supply electrical power to electrical drive 160 when extra power is needed, for example, when LCV 100 climbs a hill or accelerates. The power management with storing power in battery 150 and recovering power from battery 150 may be used for acceleration and deceleration (e.g., heavy traffic conditions).

In some embodiments, the power of electrical drive 160 of SPASCD 130 may comparable to the power of drive unit 114 of tractor 110. For example, drive unit 114 of tractor 110 may be a 15-liter diesel producing about 400 kW, while electrical drive 160 of SPASCD 130 can add 400 kW more, which may be particular useful for hill climbing or acceleration. Furthermore, some of this power of electrical drive 160 of SPASCD 130 may be used for regenerative braking reducing the strain on friction brakes of LCV 100.

Electrical drive 160 and steering component 170 may be communicatively coupled to and controlled by system controller 180. Referring to FIG. 2, other components of dolly operating mechanism 140 or, more generally, of SPASCD 130 may be also communicatively coupled to and controlled by system controller 180. For example, dolly operating mechanism 140 may also include optional gearbox 162, which mechanically couples electrical drive 160 to steerable wheels 132 and controlled by system controller 180. For example, when additional regenerative braking is needed, system controller 180 may shift gearbox 162 into a lower gear thereby increasing mechanical power transmitted from steerable wheels 132 to electrical drive 160 and also increase electrical power produced by electrical drive 160.

In some embodiments, dolly operating mechanism 140 includes drive inverter 164 electrically coupling battery 150 and electrical drive 160. System controller 180 may control drive inverter 164. Drive inverter 164 may change various characteristics of electrical current flowing between battery 150 and electrical drive 160 (e.g., alternating current to direct current, changing voltage, changing frequency).

In some embodiments, dolly operating mechanism 140 includes one or more sensors 190. Some examples of sensors 190 include, but are not limited to, velocity sensor 192, accelerometer 194, and coupler angle sensor 196. Velocity sensor 192 may be operable to measure the direction and magnitude of the velocity of SPASCD 130. The output of velocity sensor 192 may be used for controlling various characteristics of steering steerable wheels 132. For example, the output of velocity sensor 192 positioned on SPASCD 130 may be compared to the output of a similar velocity sensor positioned on tractor 110 and/or another SPASCD. The location difference (e.g., based on the travelling speed and corresponding time delay) may be also considered in order to match the sensor output to a particular location on the road. In other words, when tractor 110 starts steering its steerable wheels as tractor 110 passes a particular location, SPASCD 130 may also need to star steering its steerable wheels at the same location. This location matching ensures that both tractor 110 and trailer 120 follow the same path resulting in a constant turning radius. The output of accelerometer 194 and coupler angle sensor 196 may also be used for controlling operations of steering steerable wheels 132.

System controller 180 may be communicatively coupled to sensors 190 (to receive various outputs from sensors 190). Furthermore, system controller 180 may be communicatively coupled to drive converter 164 to control drive converter 164, e.g., switching drive converter 164 between different operating regimes. System controller 180 may be communicatively coupled to battery 150, e.g., to receive output from battery 150, which may represent the state of charge of battery 150 and/or other characteristics of battery (e.g., battery's temperature). In some embodiments, system controller 180 may be communicatively coupled to steering component 170 for controlling steering component 170 and/or receiving output from steering component 170 (e.g., representing the steering angle of steerable wheel 132). System controller 180 may be communicatively coupled to steerable wheel 132, e.g., to receive output representing the wheel speed and/or other characteristics of steerable wheels 132.

In some embodiments, system controller 180 may be communicatively coupled to tractor 110 or another trailer, e.g., to receive and send control signals to various components of tractor 110. For example, system controller 180 may receive output from a position sensor on the accelerator pedal of tractor 110, from an engine controller (e.g., ECU), a transmission controller, steering angle sensor, and the like. In one example, the accelerator pedal of tractor 110 may be used as one of the inputs by system controller 180 to determine the operating regime of electrical drive 160. If the accelerator pedal is not pressed, then system controller 180 may instruct drive inverter 164 to operate electrical drive 160 in the power-generating mode (effectively slowing down LCV 100). Alternatively, if the accelerator pedal is pressed beyond a certain threshold, then system controller 180 may instruct drive inverter 164 to operate electrical drive 160 in the torque-generating mode (effectively accelerating or maintaining the speed of LCV 100). Various steering aspects considering the input of the steering angle sensor of tractor 110 are described below with reference to FIG. 5.

Another input that system controller 180 may consider is the state of charge of battery 150 and, in some embodiments, the route information. If the battery 150 is fully charged, then system controller 180 may keep electrical drive 160 in the passive mode rather than switching electrical drive 160 to the power-generating mode. Furthermore, if the route information indicates that LCV 100 will approach a downhill portion of the overall route (before any additional power will be needed from SPASCD 130 then system controller 180 may keep electrical drive 160 in the passive mode rather than switching electrical drive 160 to the power generating mode (even if battery 150 is not fully charge). The additional capacity of battery 150 may be used during the downhill portion of the route for regenerative braking and putting less stress on conventional friction brakes (thereby potentially avoiding overheating of the friction brakes). The route information may be communicated to system controller 180 from a navigation system of tractor 110.

On the other hand, if the accelerator pedal is pressed, system controller 180 may instruct drive inverter 164 to operate electrical drive 160 in the torque-generating mode. Similar to the example above, another input, which system controller 180 may consider, is the charge state of battery 150 and, in some embodiments, the route information. If the battery 150 is discharged above a certain threshold, then system controller 180 may keep electrical drive 160 in the passive mode rather than switching electrical drive 160 to the torque-generating mode. Furthermore, if the route information indicates that LCV 100 will approach an uphill portion of the overall route (before any additional power can be generated from SPASCD 130), then system controller 180 may keep electrical drive 160 in the passive mode rather than switching electrical drive 160 to the torque-generating mode (even if battery 150 is fully charged). The entire capacity of battery 150 may be used during the uphill portion of the route to supplement the power provided by drive unit 114 of tractor 110. This approach allows keeping tractor 110 at a higher gear and save fuel.

In some examples, some components of SPASCD 130 can be used on tractor 110, as for example schematically shown in FIG. 1A. For example, tractor 110 may include wheels 116 now coupled to drive unit 114. Tractor battery 153, tractor electrical drive 163, and tractor system controller 183 may be added to wheels 116 and function similar to the corresponding components of SPASCD 130 described above. In some embodiments, tractor electrical drive 163 can add another 200 kW, and give some fuel efficiency improvement even when towing a single trailer. Overall, SPASCD 130 may be used with any standard trailer and any standard tractor, once that tractor has the control electronics and software fitted. There is no high voltage cabling required between the tractor and SPSDs, all of that is local to the SPSD.

Referring to the example shown in FIG. 1A, the operation of second trailer 120b may be the same or different from the operation of first trailer 120a. For example, the operation of first trailer 120a may be based on solely on input from tractor 110 (e.g., the steering angle of the steerable wheels of first trailer 120a may be determined based on the steering angle of steerable wheels 112 of tractor 110. Alternatively, the operation of first trailer 120a may be based on input from tractor 110 and second trailer 120b. For example, the steering angle of steerable wheels 132a of first trailer 120a may be adjusted based on "wobbling" of second trailer 120b (e.g., side movement of second trailer 120b, which may be determined using accelerometers positioned on second trailer 120b). In the same or another example, the power-generating and/or the torque-generating conditions of the electrical drive 160 of first trailer 120a may be determined based, at least in part, on the same conditions of the electrical drive 160 of second trailer 120b. For example, the overall power-generating and/or the torque-generating conditions of all trailers may be even distributed among multiple trailers. Alternatively, power-generating and/or the torque-generating conditions may be distributed based on measuring slip conditions of steerable wheels on each trailer.

In some embodiments, the operation of second trailer 120b is solely based on input from tractor 110. Alternatively, the operation of second trailer 120b may be based on input both from tractor 110 and first trailer 120a. Furthermore, the operation of second trailer 120b may be solely based on input from first trailer 120a.

Figure 3:
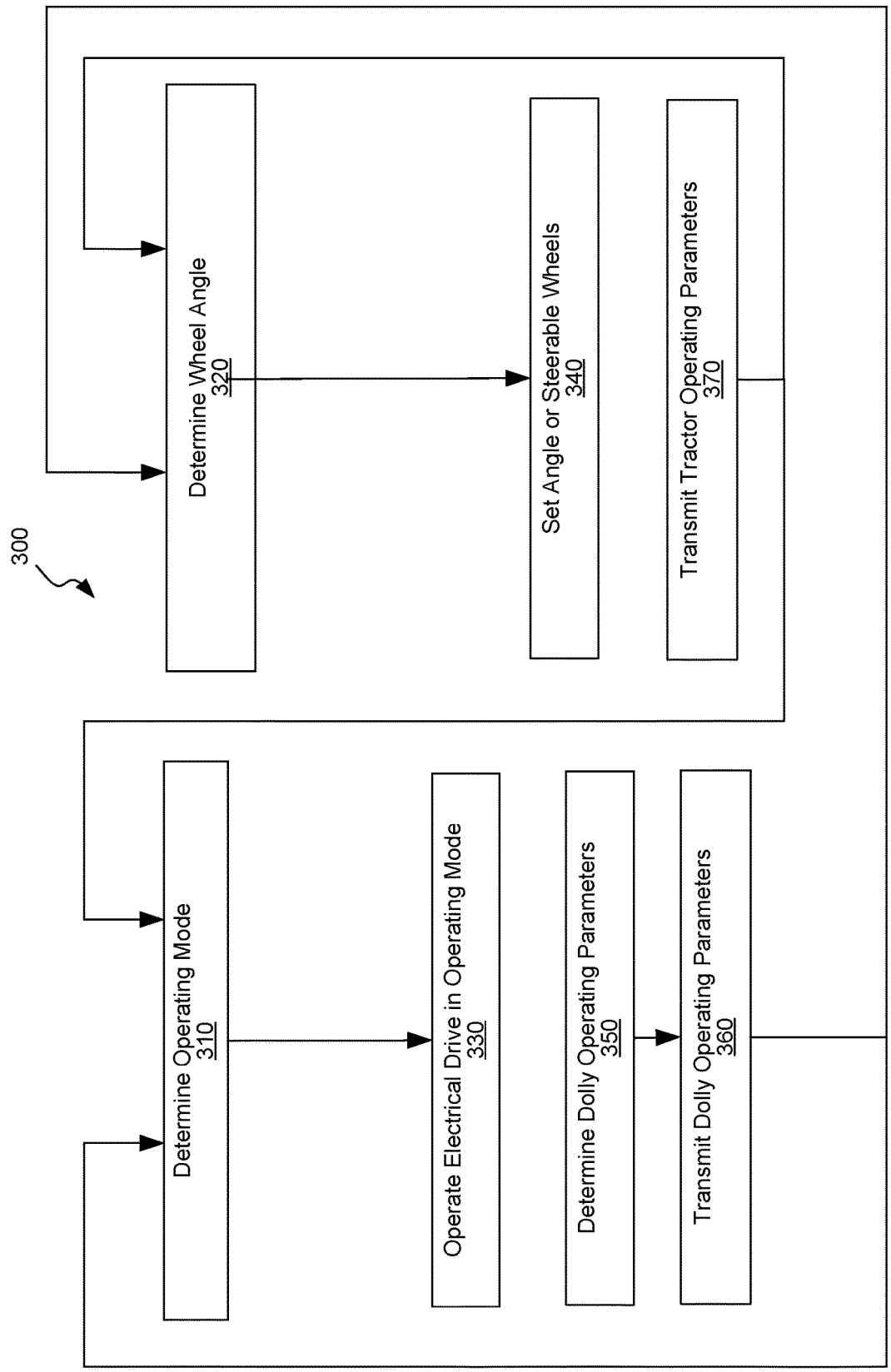
FIG. 3 is a flowchart corresponding to a method of operating a LCV comprising a tractor and a trailer with a SPASCD, in accordance with some embodiments.

FIG. 3 is a flowchart corresponding to method 300 of operating LCV 100 or, more specifically, SPASCD 130, in accordance with some embodiments. Method 300 may involve determining the operating mode of electrical drive 160 (as shown by block 310 in FIG. 3). This operation may be performed using system controller 180. The operating mode, determined during this operation, may be the torque-generating mode, the power-generating mode, and the passive mode. The torque-generating mode may be used when LCV 100 needs additional power from SPASCD 130. The power-generating mode may be used when LCV 100 does not need additional power from SPASCD 130 and/or when LCV 100 needs some power to be directed to SPASCD 130 (e.g., during regenerative braking). The passive mode may be used when LCV 100 does not need any additional power from SPASCD 130. In addition to the power demand from LCV 100, another factor during the operation corresponding to block 310 may be the state of charge of battery 150. For example, electrical drive 160 may not be switched to the torque-generating mode when battery 150 is fully discharged. In a similar manner, electrical drive 160 may not be switched to the power-generating mode when battery 150 is fully charged.

Figure 4:
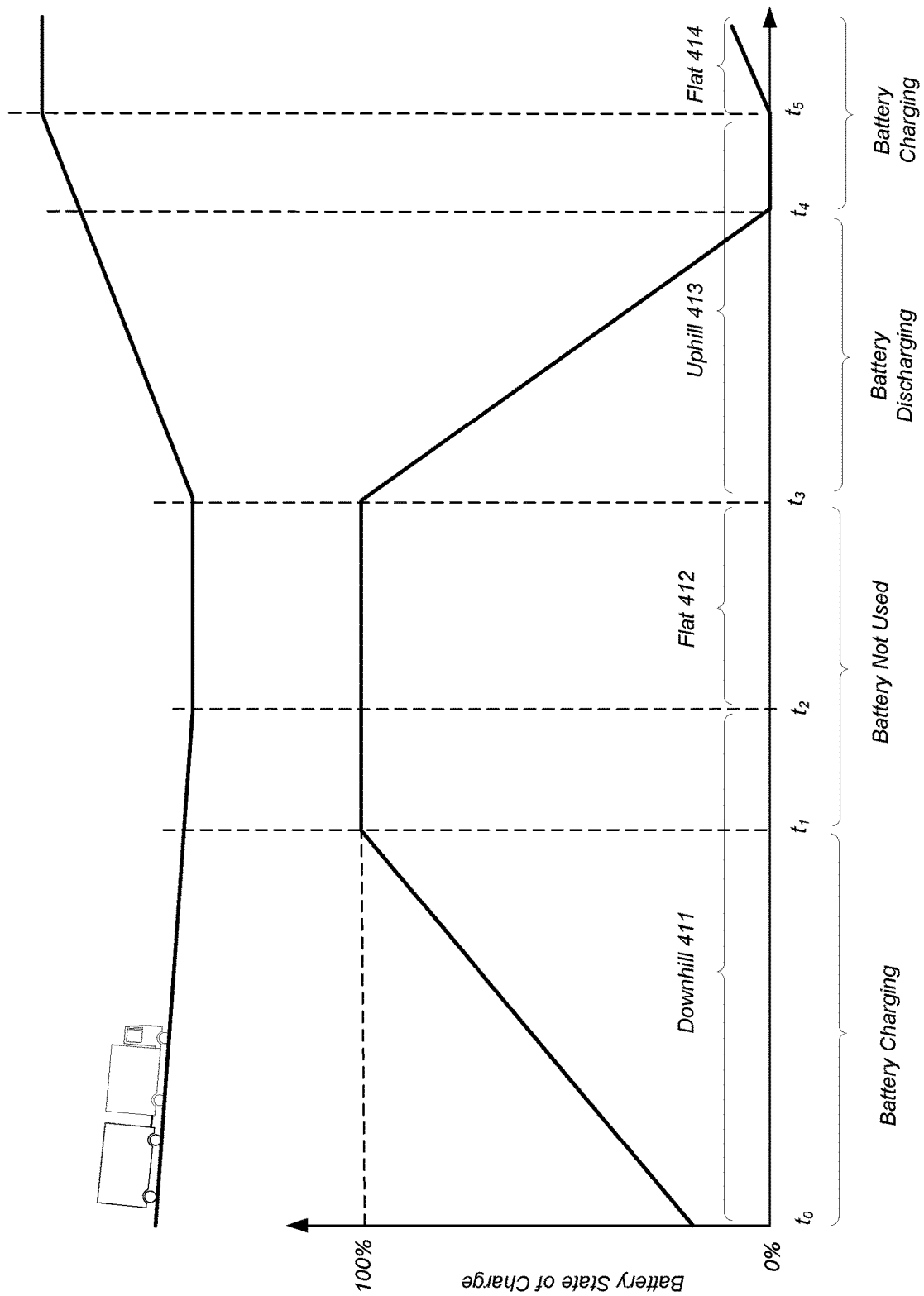
FIG. 4 is a schematic illustration of a profile for controlling state of change of a battery of a SPASCD during operation of an LCV, in accordance with some embodiments.

The power demand from LCV 100 may be based on immediate factors (e.g., position of the accelerator pedal) and/or projected factors (e.g., the route information). For example, system controller 180 may determine the operating mode of electrical drive 160 based on the route information to maximize fuel economy, minimize wear of the friction brakes, and/or improve safety of LCV 100. This aspect will now be described with reference to FIG. 4. FIG. 4 is an example of the battery state of change as a function of time. Above this plot, FIG. 4 also illustrates a route of LCV 100, which include downhill portion 411 (travelled between times $t_0$ and $t_2$), first flat portion 412 (travelled between times $t_2$ and $t_3$), uphill portion 413 (travelled between times $t_3$ and $t_5$), and second flat portion (travelled after time $t_5$).

Initially (at $t_0$), battery 150 may be partially discharges. Electrical drive 160 may be operated in the power-generating mode (e.g., recuperative braking may be used) during at least a part of downhill portion 411, until battery 150 is fully charged at $t_1$. Between times $t_0$ and $t_1$, the recuperative braking may reduce the stress on the friction brakes of LCV 100. In this example, battery 150 is fully charged at $t_1$, which is before the end of downhill portion 411 at $t_2$. As such, the remaining portion of 411 (between times $t_1$ and $t_2$), electrical drive 160 may be operated in the passive mode. In other examples, electrical drive 160 may be operated in the power-generating mode until the end of downhill portion 411. More specifically, battery 150 may reach its fully charged state at the end of downhill portion 411 or not reach its fully charge state at all.

Referring to FIG. 4, electrical drive 160 may be operated in the passive mode during first flat portion 412 (travelled between times $t_2$ and $t_3$). Battery 150 is fully charged during this time. System controller 180 may be aware of upcoming uphill portion 413 (travelled between times $t_3$ and $t_5$), during which the power will be required from electrical drive 160 more than during first flat portion 412. As such, the battery charge may be preserve during this first flat portion 412 and the power may be provided by tractor 110. On other hand, if first flat portion 412 follows by another downhill portion, then electrical drive 160 may be operated in the torque-generating mode during first flat portion 412. In this example, battery 150 may be at least partially discharge to allow for recuperative braking during the upcoming downhill portion. Overall, in some embodiments, the route information may be used by system controller 180 to have the battery state of charge higher before uphill portions than before downhill portions.

Once LCV 100 reaches uphill portion 413 (travelled between times $t_3$ and $t_5$), electrical drive 160 switched to the torque-generating mode and battery 150 starts discharging. The example presented in FIG. 4 illustrated battery 150 being fully discharged by $t_4$ and before reaching end of uphill portion 413 (at $t_5$). In this example, electrical drive 160 has to switch back to the passive mode. Alternatively, the torque-generating mode may be controlled in such a way that battery 150 is not fully discharged until reaching end of uphill portion 413 (at $t_5$). In fact, some minimal capacity may be saved in battery 150 to operating steering component 170.

Referring to FIG. 4, upon reaching second flat portion (at time $t_5$), electrical drive 160 may be switched back to the power-generating mode and battery 150 starts charging again. Alternatively, electrical drive 160 may stay in the passive move until reaching another downhill portion.

Overall, system controller 180 may utilize route information received, for example, from tractor 110 (e.g., equipped with global positioning system (GPS)) that also includes elevation information. System controller 180 and/or a similar system ion tractor 110 may make decisions when to charge battery 150 (e.g., by applying regenerative braking) and when to add drive power (e.g., by discharging the battery). For example, SPASCD 130 may be configured to arrive at the bottom of a downhill portion of the route with a full battery. Likewise, SPASCD 130 may be configured to use the battery charge by the time the top of the hill is reached. System controller 180 may limit the power of electrical drive 160 during the uphill portion so that battery 150 lasts until the top of the hill. This allows keep tractor 110 in a higher gear all the way up the hill, which is more efficient from the fuel consumption standpoint.

The following are savings estimates of operating an LCV with two trailers, each equipped with an SPASCD, in comparison with a conventional tractor hauling a single trailer. The saving of about $0.035 per mile is attributed to reduced fuel consumption due to a reduced aero drag. The saving of about $0.075 per mile is also attributed to reduced fuel consumption due engine downsizing, i.e., using one tractor with one engine for two trailers. A single engine may be able to support both trailers at cruising speeds. Electrical drives of SPASCDs may assist the tractor engine during acceleration and uphill portions of the route. The saving of about $0.075 per mile on average (variable due to the route and traffic conditions) is attributed to regenerative braking energy recovery. Finally, the saving of about $0.75 per mile is attributed to labor cost savings, using one instead of two drivers.

Returning to FIG. 3, method 300 may proceed with operating electrical drive 160 in the operating mode determined by system controller 180 (block 330). Specifically, in the power-generating mode, electrical drive 160 converts mechanical power received from steerable wheels 132 into electrical power transmitted to battery 150. This operation may be referred to as regenerative braking. In the torque-generating mode, electrical drive 160 converts electrical power received from battery 150 to mechanical power transmitted to steerable wheels 132. In the passive mode, electrical drive 160 neither generates nor converts electrical power or mechanical power;

Method 300 may also involve determining the wheel angle of steerable wheels 132 (as shown by block 320 in FIG. 3). As described above, various parameters may be taken into account during this operation. One example will now be described in more detail with reference to FIG. 5. This operation may be triggered by steerable wheels 112 of tractor 110 to start turning at $t_0$. At that point, steerable wheels 112 of tractor 110 may pass a specific location on the road, which will be referred to as a first position. In other words, at $t_0$, steerable wheels 112 of tractor 110 start turning while, passing the first position. In order for all trailers to follow the route of tractor 110, steerable wheels 132a and 132b of trailers 120a and 120b should not turn until reaching the first position. The plot shows that steerable wheel 132a of 120a start turning at $t_1$, e.g., steerable wheel 132a of first trailer 120a pass the first position. The time period between $t_0$ and $t_1$ depends on the distance between steerable wheels 112 of tractor 110 and steerable wheel 132a of first trailer 120a and the travel speed of LCV 100 and may be calculated by system controller 180 based on various control signals received from other components (e.g., a velocity sensor). At $t_2$, steerable wheels 112 of tractor 110 may start returning to the straight position. This time reference may be used to determine times at which steerable wheels 132a and 132b of trailers 120a and 120b are also returned to the straight position.

Figure 5:
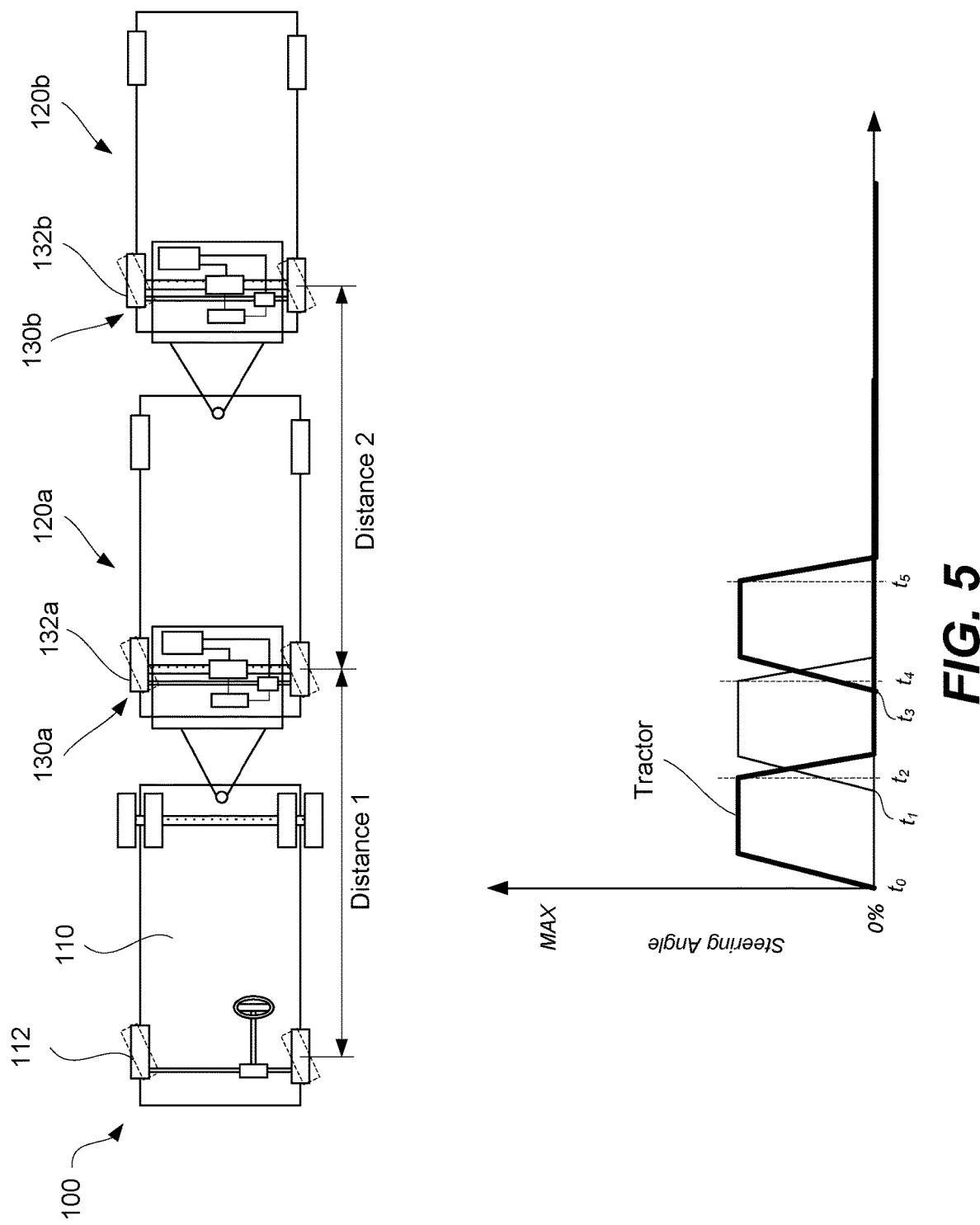
FIG. 5 is a schematic illustration of controlling a steering angle of steerable wheels of a SPASCD during operation of an LCV, in accordance with some embodiments.

The plot in FIG. 5 also shows that steerable wheel 132b of second trailer 120b start turning at $t_3$, e.g., when steerable wheel 132b of second trailer 120b passes the first position. This time ($t_3$) may be determined using $t_0$ or $t_1$ as a reference. For example, the time period between $t_0$ and $t_2$ depends on the distance between steerable wheels 112 of tractor 110 and steerable wheel 132b of second trailer 120b and the travel speed of LCV 100 and may be calculated by system controller 180 based on various control signals received from other components (e.g., a velocity sensor).

Overall, by steering steerable wheels each SPASCD, the track of each trailer may be made to follow the track of tractor 110. The input for controlling the steering angle of steerable wheels each SPASCD may be at least in part based on controls received from tractor 110. For example, the position of steerable wheels 112 of tractor 110 may be used as input. As such, LCV 100 with multiple trailers may be driven through a truck stop for fueling, off the freeway to distribution and logistics centers, and other narrow roads and spaces similar to conventional tractors with a single trailer. The high speed stability of LCV 100 can also be improved.

Figure 6A:
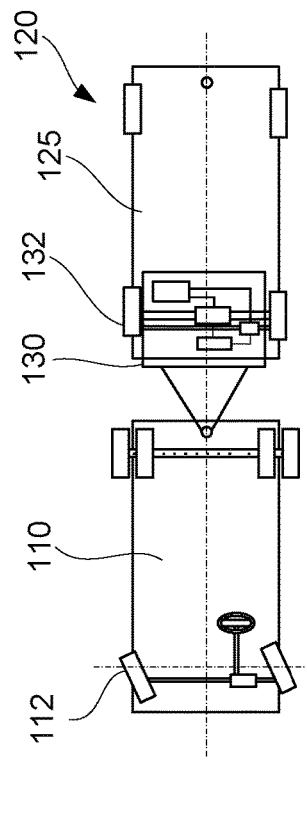
FIGS. 6A-6D is a schematic illustration of additional aspects for controlling a steering angle of steerable wheels of a SPASCD during operation of an LCV, in accordance with some embodiments.
Figure 6B:
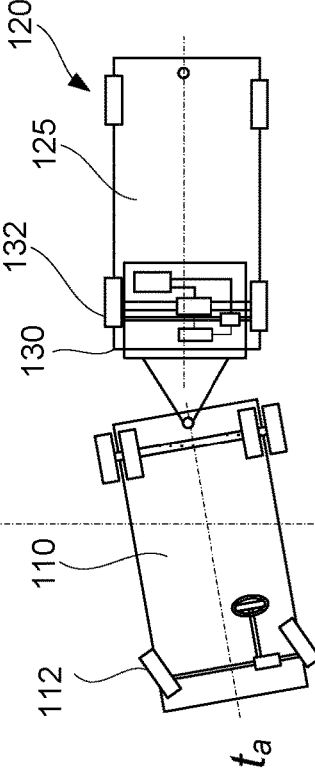
Figure 6C:
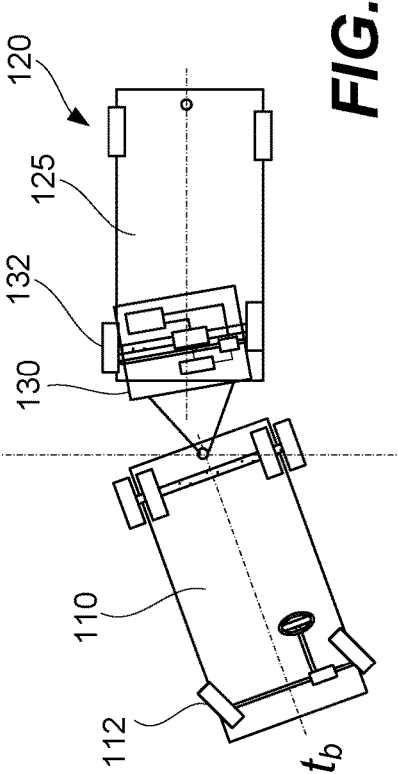
Figure 6D:
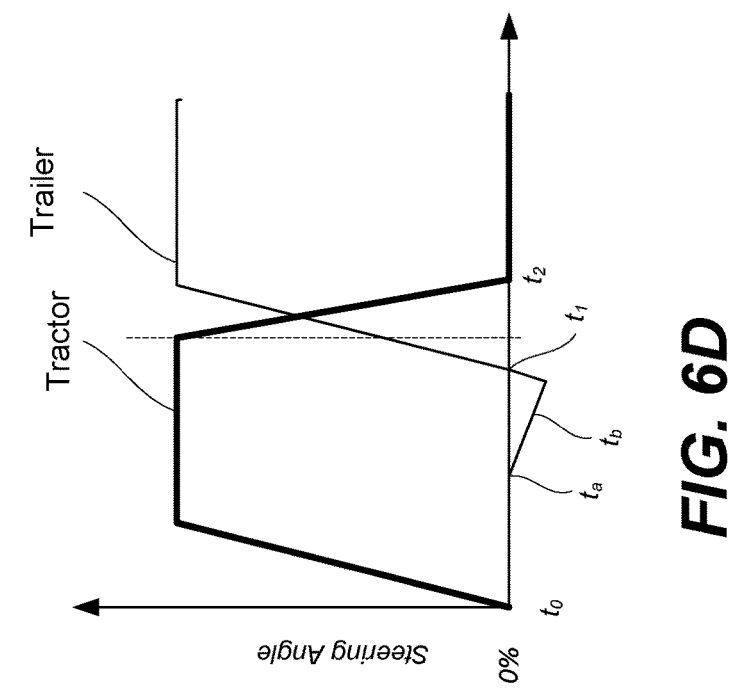

Another steering aspect of SPASCD 130 may result from SPASCD 130 being able to turn relative to rear portion 125 of trailer 120 as will now be described with reference to FIGS. 6A-6D. Specifically, as tractor 100 turns, SPASCD 130 may also turn relative to rear portion 125 of trailer 120. If the steering angle of steerable wheels 132 of SPASCD 130 does not change, then the turn of SPASCD 130 will also turn steerable wheels 132 relative to rear portion 125 of trailer 120. If that happens before, steerable wheels 132 reach the position at which steerable wheels 112 of tractor 110 have been turned, then steerable wheels 132 of SPASCD 130 will follow a different track (with a shorter radius). To avoid this, the steering angle of steerable wheels 132 of SPASCD 130 may be controlled based on response of a coupler angle sensor (measuring the angle between tractor 100 and dolly coupler 134) or an dolly angle sensor (measuring the angle between SPASCD 130 and rear portion 125 of trailer 120). For example, the steering angle of steerable wheels 132 of SPASCD 130 may be maintained parallel to the longitudinal axis of rear portion 125 of trailer 120 until steerable wheels 132 reach the position at which steerable wheels 112 of tractor 110 have been turned. To achieve this, steerable wheels 132 of SPASCD 130 may be first turned into opposite direction as schematically shown in FIG. 6D between $t_a$ and time $t_b$. As soon as steerable wheels 132 reach the position at which steerable wheels 112 of tractor 110 have been turned, i.e., time ($t_1$), the steering angle may be set the same as steerable wheels 112 of tractor 110. Overall, the angle between tractor 100 and dolly coupler 134 and/or the angle between SPASCD 130 and rear portion 125 of trailer 120 may be also considered when determining the steering angle of steerable wheels 132 of SPASCD 130.

Returning to FIG. 3, method 300 may proceed with setting the steering angle of steerable wheels 132 (block 340). The steering angle is set using steering component 170, which is mechanically coupled to steerable wheels 132. Steering component 170 is also electrically coupled to battery 150 and received electrical power from battery 150 during this operation. For example, steering component 170 may comprise an electrical actuator. Finally, steering component 170 is also communicatively coupled to system controller 180, from which steering component 170 receives input corresponding to the determined steering angle.

Method 300 may comprise determining one or more dolly operating parameters of SPASCD 130 (block 350). Some examples of these dolly operating parameters include, but are not limited to the velocity of SPASCD 130, the wheel speed of steerable wheels 132, the acceleration of SPASCD 130, and the angle of dolly coupler 134 relative to tractor 110. The velocity of SPASCD 130 may be determined using a velocity sensor. The wheel speed of steerable wheels 132 may be determined using a wheel speed sensor. The acceleration of SPASCD 130 may be determined using an accelerometer. Finally, the angle of dolly coupler 134 relative to tractor 110 may be determined using a coupler angle sensor.

Method 300 may comprise transmitting the one or more dolly operating parameters to system controller 180 (block 360). System controller 180 then used these dolly operating parameters to determine the operating mode of electrical drive 160 and/or to determine the steering angle of steerable wheels 132 as described above.

Method 300 may comprise transmitting one or more tractor operating parameters to system controller 180 (block 370). Some examples of tractor operating parameters include, but are not limited to, a position of an accelerator pedal of tractor 110, a steering angle of steerable wheels of tractor 110, a route map (e.g., including elevation of each point on the route map), and a current location of tractor 110. System controller 180 uses these tractor operating parameters to determine the operating mode of electrical drive 160 and to determine the steering angle of steerable wheels 132 as described above.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A self-powered actively steerable converter dolly for use in a trailer of a long combination vehicle, the self-powered actively steerable converter dolly comprising:
    steerable wheels;
    a battery;
    an electrical drive, mechanically coupled to the steerable wheels, electrically coupled to the battery, and configured to operate in one of operating modes selected from the group consisting of a power-generating mode, a torque-generating mode, and a passive mode, wherein:
        in the power-generating mode, the electrical drive is configured to convert mechanical power received from the steerable wheels into electrical power transmitted to the battery,
        in the torque-generating mode, the electrical drive is configured to convert electrical power received from the battery to mechanical power transmitted to the steerable wheels, and
        in the passive mode, the electrical drive is configured to neither generate nor convert electrical power or mechanical power;
    a steering component, mechanically coupled to the steerable wheels and electrically coupled to the battery, wherein the steering component is configured to change a steering angle of the steerable wheels; and
    a system controller, communicatively coupled to the electrical drive and to the steering component and configured to select one of the operating mode of the electrical drive and to determine the steering angle of the steerable wheels.

2. The self-powered actively steerable converter dolly of claim 1, further comprising one or more sensors selected from the group consisting of a velocity sensor, a wheel speed sensor, an accelerometer, and a coupler angle sensor, wherein the system controller is communicatively coupled to the one or more sensors and configured to receive input from the one or more sensors.

3. The self-powered actively steerable converter dolly of claim 2, wherein the system controller is configured to select one of the operating modes of the electrical drive and to determine the steering angle of the steerable wheels based on the input received from the one or more sensors.

4. The self-powered actively steerable converter dolly of claim 1, wherein the system controller is configured to communicatively couple to the tractor and to select one of the operating modes of the electrical drive and to determine the steering angle of the steerable wheels based on input received from the tractor.

5. The self-powered actively steerable converter dolly of claim 4, wherein the input from the tractor is selected from the group consisting of a position of an accelerator pedal of the tractor, a steering angle of steerable wheels of the tractor, a route map, and a current location.

6. The self-powered actively steerable converter dolly of claim 1, wherein the system controller is configured to communicatively couple to the additional trailer and to select one of the operating modes of the electrical drive and to determine the steering angle of the steerable wheels based on input received from the additional trailer.

7. The self-powered actively steerable converter dolly of claim 1, further comprising a drive inverter, electrically coupled to the battery and to the electrical drive and communicatively coupled to the system controller, wherein the drive inverter is configured to change one or more characteristics of an electrical current transmitted between the battery and to the electrical drive.

8. The self-powered actively steerable converter dolly of claim 1, further comprising a gearbox, coupling the steerable wheels to the electrical drive, wherein the gearbox is communicatively coupled to the system controller and configured to switch gears based on input from the system controller.

9. The self-powered actively steerable converter dolly of claim 1, wherein the self-powered actively steerable converter dolly is configured to rotatably and detachably couple to a rear portion the trailer.

10. The self-powered actively steerable converter dolly of claim 9, further comprising a rotatable coupling mechanism shaped as a slot and configured to receive a kingpin of the rear portion of the trailer such that the rear portion of the trailer is able to rotate relative to the self-powered actively steerable converter dolly.

11. A long combination vehicle comprising:
    a tractor; and
    a trailer, detachably coupled to the tractor, wherein the trailer comprises a rear portion and a self-powered actively steerable converter dolly, coupled to the rear portion, wherein the self-powered actively steerable converter dolly comprises:
        steerable wheels;
        a battery;
        an electrical drive, mechanically coupled to the steerable wheels, electrically coupled to the battery, and configured to operate in one of operating modes selected from the group consisting of a power-generating mode, a torque-generating mode, and a passive mode, wherein:
            in the power-generating mode, the electrical drive is configured to convert mechanical power received from the steerable wheels into electrical power transmitted to the battery,
in the torque-generating mode, the electrical drive is configured to convert electrical power received from the battery to mechanical power transmitted to the steerable wheels, and
in the passive mode, the electrical drive is configured to neither generate nor convert electrical power or mechanical power;
a steering component, mechanically coupled to the steerable wheels and electrically coupled to the battery, wherein the steering component is configured to change a steering angle of the steerable wheels; and
a system controller, communicatively coupled to the electrical drive and to the steering component and configured to select one of the operating mode of the electrical drive and to determine the steering angle of the steerable wheels.

12. The long combination vehicle of claim 11, wherein the system controller is communicatively coupled to the tractor and is configured to select one of the operating modes of the electrical drive and to determine the steering angle of the steerable wheels based on input received from the tractor.

13. The long combination vehicle of claim 12, wherein the input from the tractor is selected from the group consisting of a position of an accelerator pedal of the tractor, a steering angle of steerable wheels of the tractor, a route map, and a current location.

14. The long combination vehicle of claim 11, wherein the self-powered actively steerable converter dolly is configured to rotatably and detachably couple to a rear portion a trailer.

15. The long combination vehicle of claim 14, wherein the self-powered actively steerable converter dolly further comprises a rotatable coupling mechanism shaped as a lot and configured to receive a kingpin of the rear portion of the trailer such that the rear portion of the trailer is able to rotate relative to the self-powered actively steerable converter dolly.

16. A method of operating a long combination vehicle, comprising a tractor a trailer, detachably coupled to the tractor, wherein the trailer comprises a self-powered actively steerable converter dolly, comprising steerable wheels, a battery, an electrical drive, and a steering component, and a system controller, the method comprising:
determining an operating mode of the electrical drive, wherein the operating mode is determined using the system controller, and wherein the operating mode is selected from the group consisting of a power-generating mode, a torque-generating mode, and a passive mode;
operating the electrical drive in the operating mode determined by the system controller, wherein:
in the power-generating mode, the electrical drive converts mechanical power received from the steerable wheels into electrical power transmitted to the battery,
in the torque-generating mode, the electrical drive converts electrical power received from the battery to mechanical power transmitted to the steerable wheels, and
in the passive mode, the electrical drive neither generates nor converts electrical power or mechanical power;
determining a steering angle of the steerable wheels, wherein the steering angle is determined using the system controller;
setting the steering angle of the steerable wheels using the steering component, mechanically coupled to the steerable wheels and electrically coupled to the battery.

17. The method of claim 16, further comprising:
determining one or more dolly operating parameters of the self-powered actively steerable converter dolly, wherein the one or more dolly operating parameters are selected from the group consisting of:
velocity of the self-powered actively steerable converter dolly determined using a velocity sensor,
wheel speed of the steerable wheels determined using a wheel speed sensor,
acceleration of the self-powered actively steerable converter determined using an accelerometer, and
an angle of a dolly coupler relative to the tractor determined using a coupler angle sensor; and
an angle of the self-powered actively steerable converter dolly relative to a remaining part of the trailer; and
transmitting the one or more dolly operating parameters to the system controller, wherein the system controller determines the operating mode of the electrical drive and determines the steering angle of the steerable wheels based on the one or more dolly operating parameters.

18. The method of claim 16, further comprising transmitting one or more tractor operating parameters to the system controller, wherein the one or more tractor operating parameters comprise a position of an accelerator pedal of the tractor, a steering angle of steerable wheels of the tractor, a route map, and a current location, wherein the system controller determines the operating mode of the electrical drive and determines the steering angle of the steerable wheels based on the one or more tractor operating parameters.

19. The method of claim 18, wherein the power-generating mode is selected by the system controller when the accelerator pedal of the tractor is in a released position, and the torque-generating mode is selected by the system controller when the accelerator pedal of the tractor is pressed beyond a threshold position.

20. The method of claim 18, wherein the steering angle of the steerable wheels of the self-powered actively steerable converter dolly is set equal to the steering angle of the steerable wheels of the tractor with a set delay, the set delay is a ratio of a distance between the steerable wheels of the self-powered actively steerable converter dolly and the steerable wheels of the tractor and a velocity of the long combination vehicle.

* * * * *